United States Patent
Zeevi et al.

(10) Patent No.: US 7,594,087 B2
(45) Date of Patent: Sep. 22, 2009

(54) SYSTEM AND METHOD FOR WRITING DATA TO AND ERASING DATA FROM NON-VOLATILE MEMORY

(75) Inventors: Josef Zeevi, Austin, TX (US); Grayson Dale Abbott, Pflugerville, TX (US); Richard Sanders, Hutto, TX (US); Glenn Reinhardt, Austin, TX (US)

(73) Assignee: Sigmatel, Inc., Austin, TX (US)

( * ) Notice: Subject to any disclaimer, the term of this patent is extended or adjusted under 35 U.S.C. 154(b) by 9 days.

(21) Appl. No.: 11/335,292

(22) Filed: Jan. 19, 2006

(65) Prior Publication Data

US 2007/0168632 A1 Jul. 19, 2007

(51) Int. Cl.
*G06F 13/00* (2006.01)

(52) U.S. Cl. ............... 711/165; 711/3; 711/110; 711/112; 711/169

(58) Field of Classification Search ............ 711/3, 711/159, 165, 170, 171, 172, 173
See application file for complete search history.

(56) References Cited

U.S. PATENT DOCUMENTS

| | | | |
|---|---|---|---|
| 5,479,638 A | 12/1995 | Assar et al. | |
| 5,541,886 A * | 7/1996 | Hasbun | 365/185.03 |
| 6,170,066 B1 * | 1/2001 | See | 714/22 |
| 6,567,307 B1 | 5/2003 | Estakhri | |
| 6,639,843 B2 | 10/2003 | Miyauchi | |
| 6,704,852 B2 | 3/2004 | Lai et al. | |
| 6,839,823 B1 * | 1/2005 | See et al. | 711/171 |
| 6,922,768 B2 | 7/2005 | Honda et al. | |
| 7,356,648 B2 * | 4/2008 | Shearer | 711/129 |
| 2007/0124533 A1 * | 5/2007 | Estakhri et al. | 711/103 |

* cited by examiner

*Primary Examiner*—Hetul Patel
(74) *Attorney, Agent, or Firm*—Toler Law Group

(57) ABSTRACT

A method and system for accessing a non-volatile memory is disclosed. The method includes writing a first stream of data to a first block of a first region of a non-volatile memory and detecting a full condition of the first block of the first region. Further, the method includes identifying data to be copied from the first block of the first region and copying the identified data from the first block of the first region to a second block of the first region of the non-volatile memory. The method also includes writing a second stream of data to the second block of the first region and writing a third stream of data to a first block of a second region of the non-volatile memory. In addition, the method includes detecting a full condition of the first block of the second region, identifying data to be copied from the first block of the second region and copying the identified data from the first block of the second region to a second block of the second region of the non-volatile memory. The method also includes writing a fourth stream of data to the second block of the second region of the non-volatile memory.

29 Claims, 7 Drawing Sheets

SYSTEM AND METHOD FOR WRITING DATA TO AND ERASING DATA FROM NON-VOLATILE MEMORY

FIELD OF THE DISCLOSURE

The present disclosure is related to non-volatile memory systems.

BACKGROUND

Consumer electronic devices, such as cellular telephones, digital music players, thumb drives and other handheld devices, execute increasingly complicated algorithms, such as algorithms for decoding compressed digital audio and video data and user interface algorithms. As the complexity of these algorithms increases, so does the memory usage for storing such algorithms.

Increasingly, manufacturers are turning to non-volatile memory devices, such as flash memory devices including NAND flash and NOR flash memory devices. Typically, non-volatile memory devices store data in logical units, such as memory pages and memory blocks. A set of memory pages form a memory block. Often, data is written to a page and may be read from locations within that page. Typically, a block is the smallest amount of data that may be erased.

Accessing and storing data on non-volatile memory devices, such as flash memory, may utilize virtual addressing. Non-volatile memory devices tend to wear with use and, as such, sectors within a non-volatile memory device may lose the capacity to store error free data. To reduce the problem of memory wear, microcontrollers may use "update" sectors of the memory. For example, when data is provided to a flash memory device it may be stored in a first block and when the data is updated the microcontroller may store the data in an update block, reducing wear on the first block. However, if the update sector is written too frequently, undesirable wear on the update block can result. As such, there is a need for an improved system and method for utilizing non-volatile memory.

DESCRIPTION OF THE DRAWINGS

A method and system for accessing a non-volatile memory is disclosed. The method includes writing a first stream of data to a first block of a first region of a non-volatile memory and detecting a full condition of the first block of the first region. Further, the method includes identifying data to be copied from the first block of the first region and copying the identified data from the first block of the first region to a second block of the first region of the non-volatile memory. The method also includes writing a second stream of data to the second block of the first region and writing a third stream of data to a first block of a second region of the non-volatile memory. In addition, the method includes detecting a full condition of the first block of the second region, identifying data to be copied from the first block of the second region and copying the identified data from the first block of the second region to a second block of the second region of the non-volatile memory. The method also includes writing a fourth stream of data to the second block of the second region of the non-volatile memory.

The system includes a non-volatile memory. The non-volatile memory includes a first region with a first block to store a first stream of data until a first block full condition associated with the first block is met and a second block to store selected data copied from the first block and to store a second stream of data after the first block full condition is met. The non-volatile memory also includes a second region with a third block to store a third stream of data until a third block full condition is met and a fourth block to store selected data copied from the first block and to store a fourth stream of data after the third block full condition is met.

Figure 1:
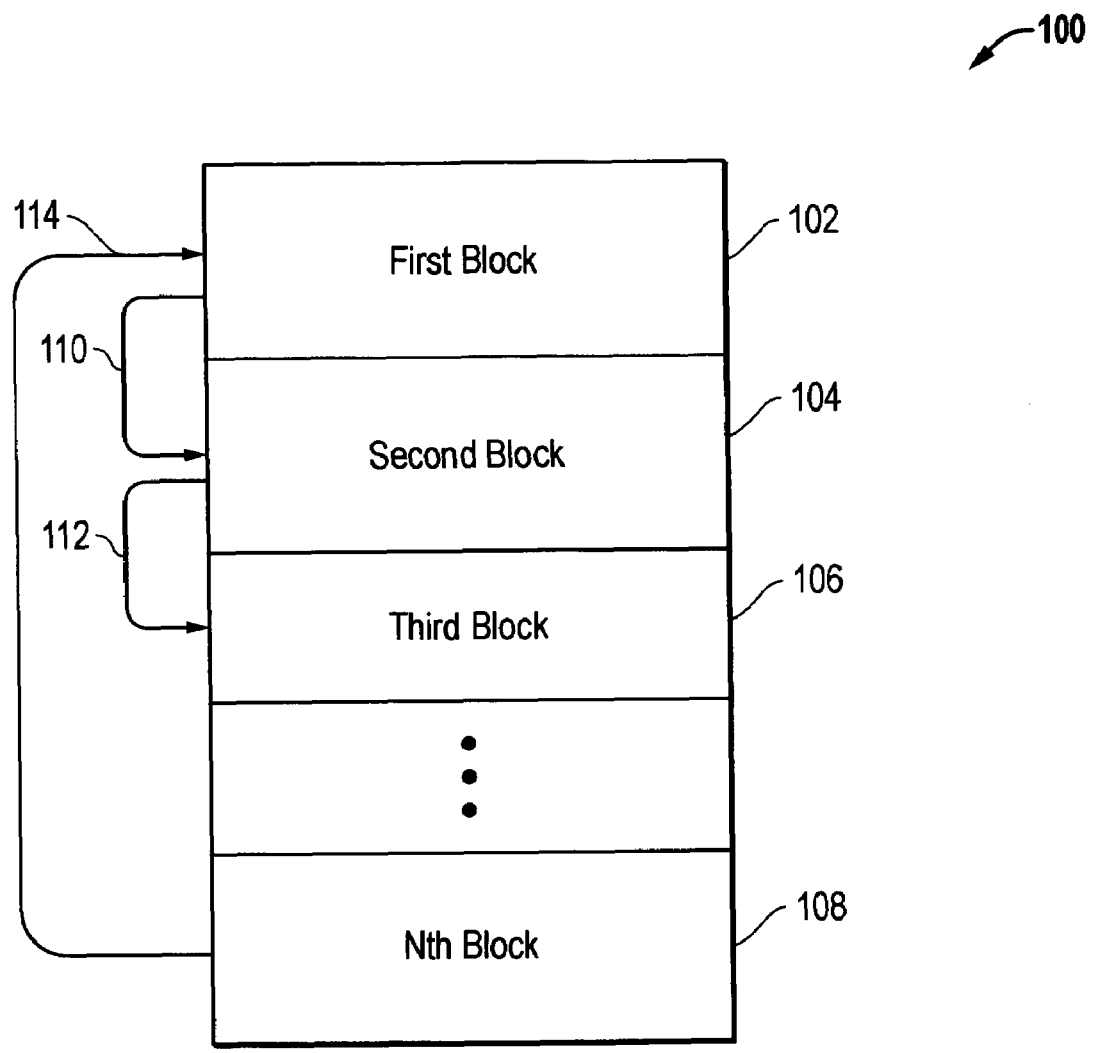
FIG. 1 illustrates a block diagram of a particular embodiment of a non-volatile memory.

Referring to FIG. 1, a block diagram of a non-volatile memory 100 is illustrated. The non-volatile memory 100 includes a first block 102, a second block 104, a third block 106, and an Nth block 108. The non-volatile memory 100 may be organized into blocks by a memory controller. The blocks may each be the same size, or may be of varying sizes.

Each block of the non-volatile memory 100, such as the first block 102, may be a physical block of memory. Further, each physical block of the non-volatile memory may be organized to include a number of sectors, as described further with respect FIG. 2. Each sector may be associated with a memory address. In addition, each physical block may be structured so that, in order to erase a portion or sector of a block, the entire block must be erased.

During operation, data is written to the non-volatile memory 100. The data may be written from a microprocessor via a memory controller, as described further below with respect to FIG. 4. The memory controller may receive a memory address from the microprocessor, as well as data to be written to the memory address. The memory controller can determine a physical block and sector of the non-volatile memory 100 that is associated with the memory address, and write the data to that sector.

However, data may be written to the same memory address more than once. In such cases, it may not be feasible to erase a particular sector of the non-volatile memory 100 associated with the memory address, because that could require erasing the entire block of memory that includes the particular sector.

In the particular embodiment of the system illustrated in FIG. 1, data is written to the non-volatile memory data by streaming the data to the first block 102. As the data is streamed, each sector of data received by the non-volatile memory is written to the next available free sector in the first block 102. The data is streamed without regard to the particular memory address associated with each sector. Because the data is streamed, data may be written to the same memory address repeatedly without requiring a block erasure.

The data is streamed to the first block 102 until the first block 102 is full. Once a full condition in the first block 102 is detected, valid data from the first block 102 is copied via to the second block 104 as indicated by the arrow 110. The full condition may be detected when a last sector of the first block 102 has been filled with data. The valid data includes the most up to date data associated with each memory address that has been written to the first block 102.

In a particular embodiment, the valid data is copied to the second block 104 without locating a free block in the non-volatile memory 100. This reduces the time required to copy the valid data, and to respond to future write operations to the non-volatile memory 100.

In addition, after the full condition is detected, the first block 102 may be marked for erasure. This indicates to the memory controller that the first block should be erased when system resources allow for it. For example, the memory controller may erase all blocks marked for erasure during a system shutdown or startup.

After the valid data has been copied to the second block 104, data that is subsequently received is streamed to free portions of the second block 104. Upon detection of a full condition in the second block 104, the valid data associated with the second block 104 is copied to the third block 106 at step 112. Valid data may include data that was previously copied from the first block 102. After the valid data has been copied to the third block 106, data is streamed to portions of the third block 106.

Data continues to be copied and streamed as sequential blocks of the non-volatile memory 100 are used. At the Nth block 108, data is copied from a previous block (i.e. the N-$1^{st}$ block) to the Nth block 108. Data is then streamed to the Nth block 108 until the block is full. Upon detection of a full condition at the Nth block 108, valid data in the Nth block 108 is copied (as indicated by the arrow 114) to the first block 102. The first block 102 will have previously been erased, as discussed above. Subsequently, received data is streamed to the first block 102.

By continuously streaming data to the non-volatile memory 100, it is possible to quickly respond to system write requests, because it is not required to interrupt the write operations to erase a block in order to perform the write operation. In a particular embodiment, data is written to the non-volatile memory at a rate that is greater than about 93 percent of a maximum writing rate associated with the non-volatile memory. In another particular embodiment, written at a rate that is greater than about 96 percent of a maximum writing rate associated with the non-volatile memory.

Further, erasure of blocks is performed at a convenient and efficient time when fast responses from the non-volatile memory 100 are not required, such as at system startup or shutdown. Further, the disclosed system allows for "wear-leveling" so that each block of the non-volatile memory experiences a similar number of write operations. This can be helpful for memory durability, because repeated writes to a single block (such as a dedicated "update" block) can lead to wear and errors for that block.

Figure 2:
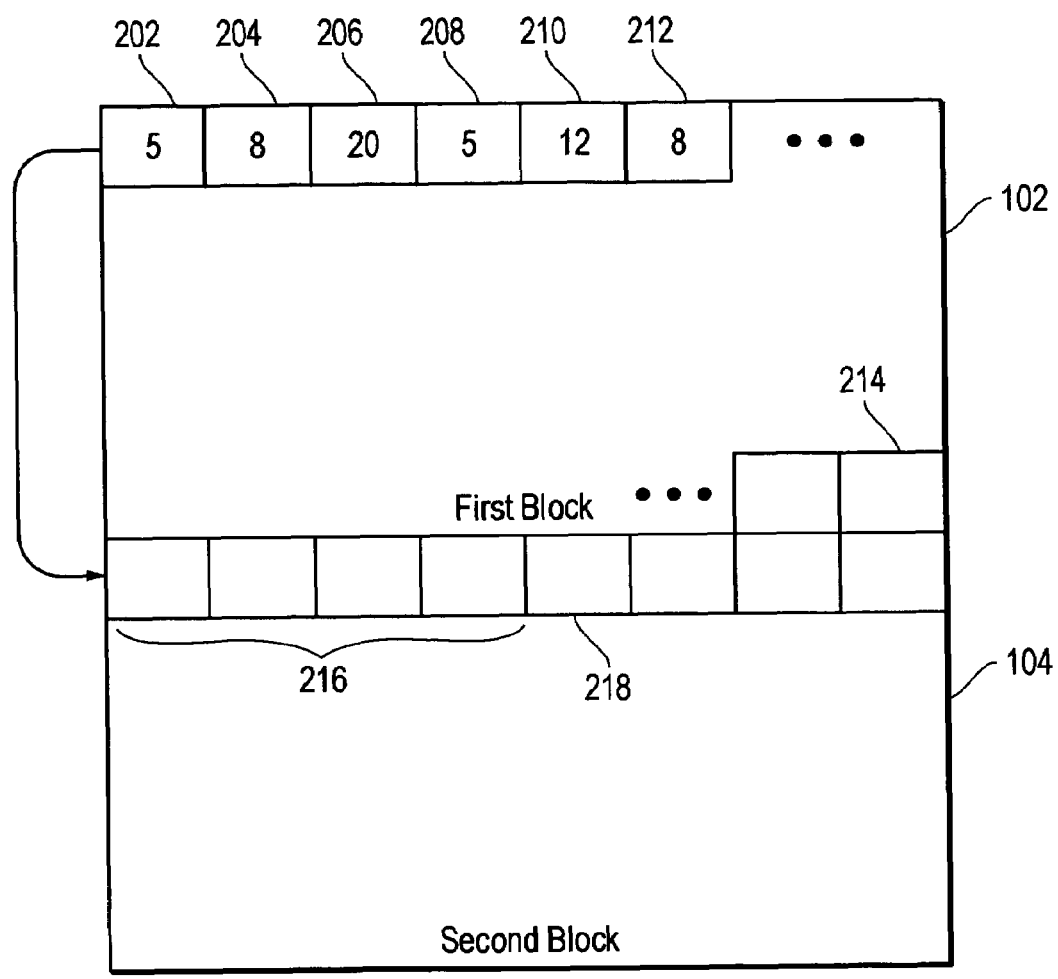
FIG. 2 is a block diagram of an illustrative embodiment of the blocks of the non-volatile memory of FIG. 1.

Referring to FIG. 2, a block diagram of a first block and a second block of a non-volatile memory, such as the non-volatile memory 100 of FIG. 1, is illustrated. The first block 102 includes a series of data sectors, including a first sector 202, a second sector 204, a third sector 206, a fourth sector 208, a fifth sector 210, and a sixth sector 212. The first block also includes a last sector 214. The second block 104 includes a copied data region 216 and a first sector 218.

During operation, data is streamed to the sectors of the first block 102. As illustrated, data is written to each of the sectors sequentially, beginning with the first sector 202. The first sector 202 receives data associated with a first memory address, in this case the address "5." The second sector 204 receives data associated with a second memory address "8." In the illustrated example, the fourth sector 208 receives updated data associated with the memory address "5." As explained further with respect to FIG. 4, a sector update table or other appropriate tracking mechanism may be updated to indicate that the most up to date data associated with the memory address 5 is located in the fourth sector 208. Similarly, the sixth sector 212 includes data associated with the memory address "8." Thus, data at the sixth sector 212 is more up to date than the data at the second sector 204. Accordingly, a table or other recording mechanism may be updated to indicate that the sixth sector 212 includes the most up to date data associated with the memory address "8."

Data continues to be streamed to the first block 102 until data is written to the last sector 214 and a full condition is detected. A full condition may be detected in a variety of ways. In a particular embodiment, the full condition is detected by detecting a final memory address for the sector 214. In another particular embodiment, the non-volatile memory 100 may set a flag indicating that the first block is full. Other ways of detecting a full condition are possible.

After the full condition of the first block 102 has been detected, the valid data associated with the first block is copied to the second block 104. The updated data may be copied to the copied data region 216. For example, as illustrated, the valid data from the sectors 208, 210, and 212 may be copied to the copied data region 216. The sectors 208 and 212 are copied because they include the most up to date data associated with the respective logical addresses. The first sector 202 and the second sector 204 may not be copied because they include old data. After copying the valid data of the first block 102 to the second block 104, the first block 102 may be marked for erasure.

After the valid data has been copied to the second block 104, subsequently received data is streamed to the second block 104, beginning at the sector 218. Data is streamed to the second block 104 until a full condition of the second block is detected.

As illustrated, streaming data to the first block 102 can reduce the number of erasures required for the first block 102. For example, because the data associated with the memory address "5" is streamed to the sector 208, rather than replacing the previous data stored at the sector 202, it is not necessary to erase the first block 102 in order to update the data associated with memory address "5." By reducing the number of erasures required, overall system overhead may be reduced, and system response time increased. In addition, the amount of "wear" on the non-volatile memory is reduced, because the sectors associated with frequently written memory locations is spread out over the non-volatile memory 100.

Figure 3:
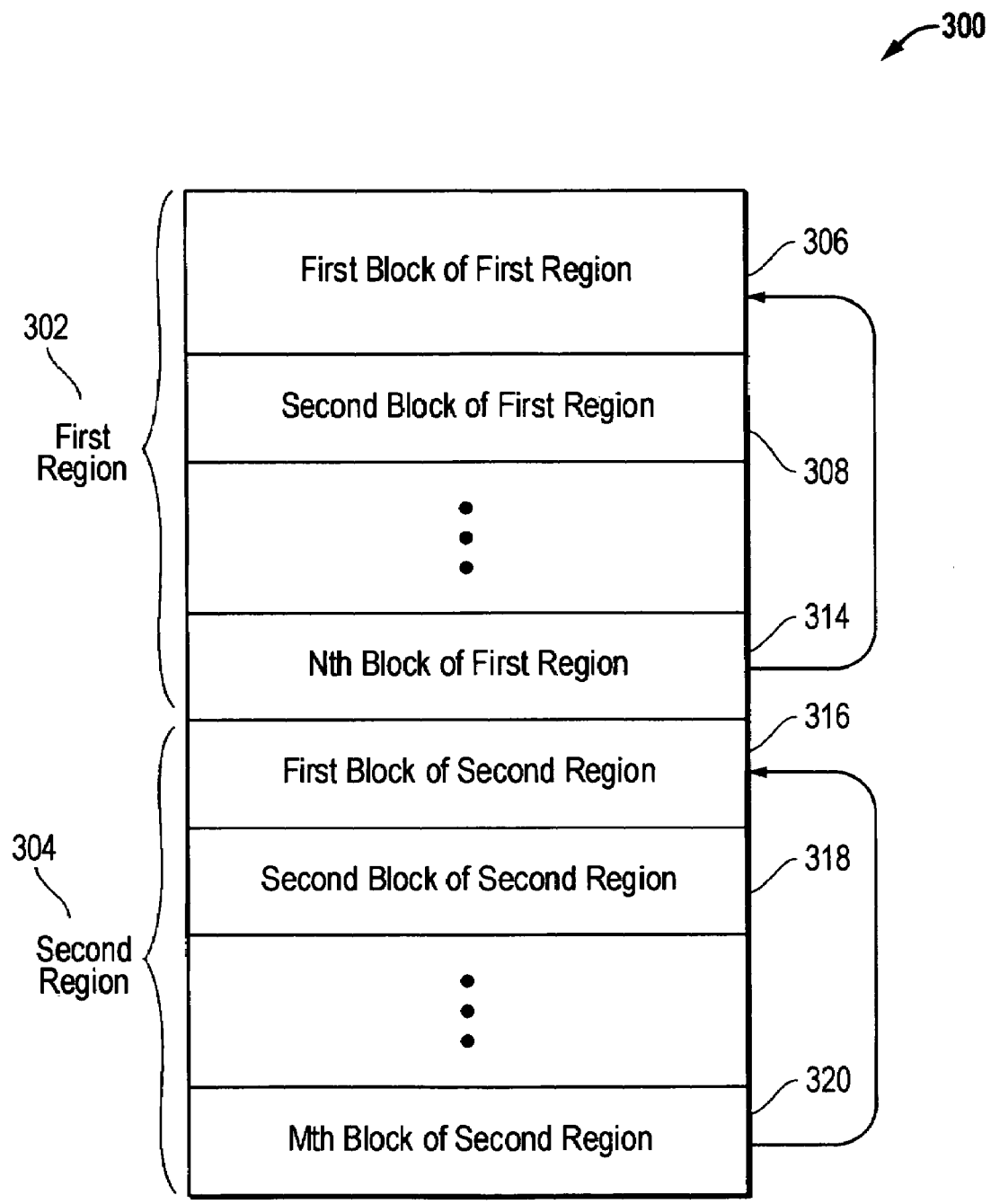
FIG. 3 is a block diagram of an alternative particular embodiment of a non-volatile memory.

Referring to FIG. 3, a block diagram of a non-volatile memory 300 is illustrated. The non-volatile memory 300 includes a first region 302 and a second region 304. The first region 302 also includes a first block 306, a second block 308 and an Nth block 314. The second region includes a first block 316, a second block 318. and an Mth block 320.

As illustrated, the non-volatile memory 300 is organized into different regions or zones. In a particular embodiment the first region 302 and the second region 304 have fixed sizes. In another particular embodiment the first region 302 and the second region 304 are of different sizes. In yet another particular embodiment the first region 302 and the second region 304 have sizes that vary over time. The size of each region may change depending on overall system performance or may be adjusted during a system startup procedure. The sizes of the regions may be tailored according to the memory table size used for addressing each region. For example, there may be a memory table associated with each region to map logical addresses associated with the region to the physical addresses of the region. These memory tables may be stored more efficiently at particular sizes. For example, if each memory table occupies a page of memory, the table may be more efficiently accessed, moved, or erased. The size of each region may be set so that the memory table associated with each region can be sized efficiently.

During operation, data is streamed to the first block 306 of the first region 302. Data may be streamed in a similar manner as described with respect to FIG. 2. Data is streamed to the first block 306 until a full condition for that block is detected. Once a full condition is detected in the first block 306, valid data associated with the first block is copied to the second block 308. Data is then streamed to the remaining portions of the second block 308. As illustrated with respect to FIG. 1, data continues to be copied and streamed to the blocks of the first region 302. Once the Nth block (i.e. last block) of the first region 314 is full, data is copied from the block 314 to the first block 306. Data is then streamed to the first block 306.

Data may also be streamed to the first block of the second region 316. Once the first block 316 is full, valid data associated with the first block 316 is copied to the second block 318. Data then continues to be streamed to the second block 318. Once the Mth block (i.e. the last block of the second region 304 of the second region 320 is full, valid data associated with the Mth block 320 is copied to the first block 316. Data then continues to be streamed to the first block 316.

Figure 4:
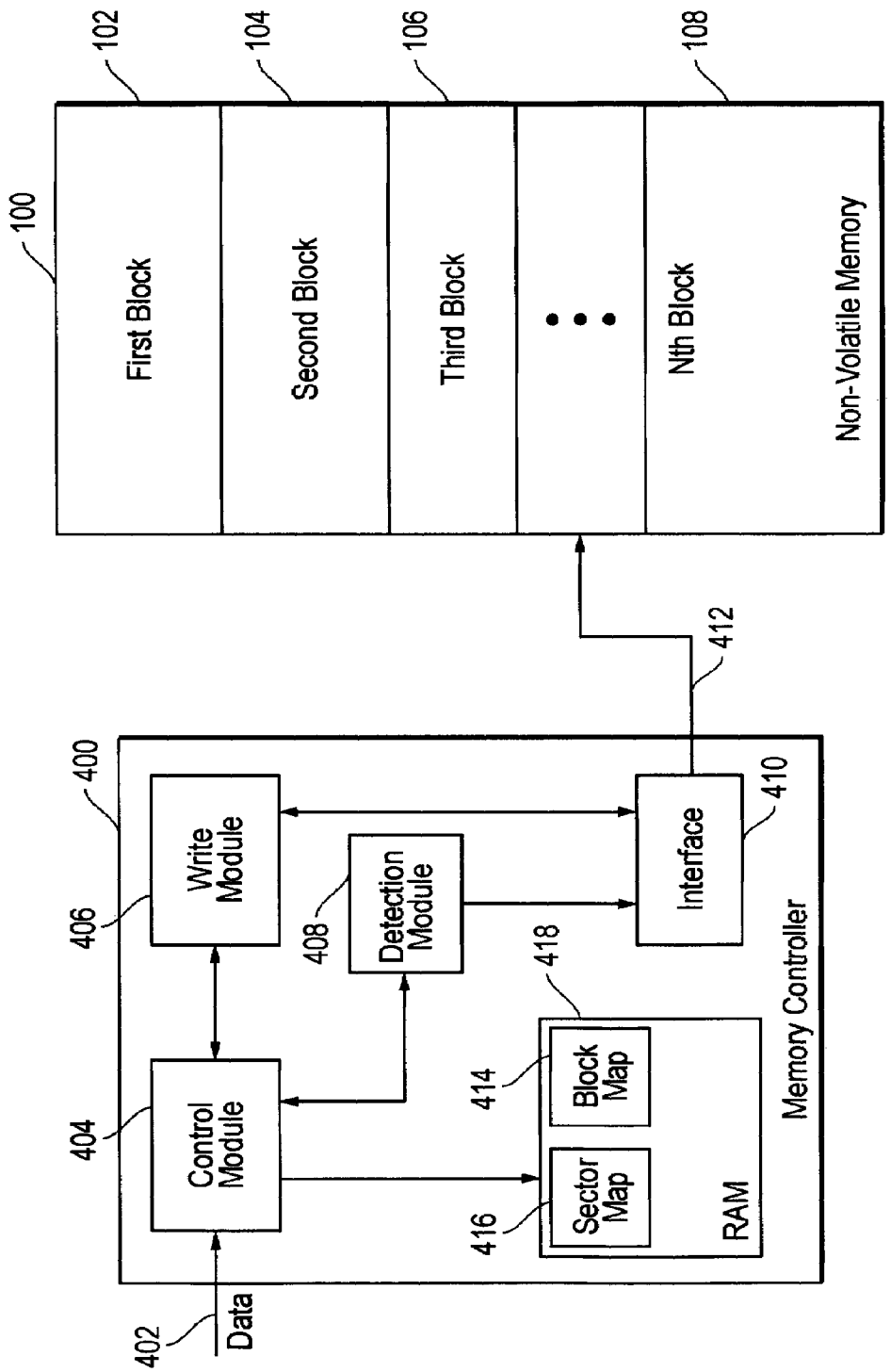
FIG. 4 is a block diagram of a particular embodiment of memory controller system for use with the non-volatile memories of FIG. 1 and FIG. 2.

Referring to FIG. 4, a memory controller for use with the non-volatile memories of FIG. 1 and FIG. 2 is illustrated. A memory system is disclosed that includes a memory controller 400 and a non-volatile memory 100. The memory controller 400 includes a control module 404 and a write module 406. The memory controller 400 also includes a detection module 408. The memory controller 400 further includes a random access memory (RAM) 418, and an interface 410. The RAM 418 includes a block map 414 and a sector map 416. The non-volatile memory 100 includes a plurality of blocks including a first block 102, a second block 104, a third block 106, up to an Nth block 108.

The memory controller receives data via the input 402. The control module 404 is responsive to the data input 402, and the detection module 408 is responsive to the control module 404. The RAM 418 is also responsive to the control module 404. The interface 410 is responsive to the write module 406 and the write module 406 is responsive to the control module 404.

During operation, the control module 404 receives data via the input 402. Data may be received from a microprocessor host or other device. The data may include a memory address portion and a data portion. The control module 404 controls the write module 406 to write data to the non-volatile memory via the interface 410. The interface 410 is used to write data via the data bus 412 to the non-volatile memory 100.

To write the data to the non-volatile memory 100, the write module 410 streams data to the first block 102. In particular, the first block 102 includes a number of sectors, as illustrated in FIG. 2. When data is received by the write module 410, the write module 410 writes the data to the next free sector of the first block 102. The write module 410 also instructs the control module 404 to update the sector map 416 and block map 414 in the RAM 418. The sector map 416 is updated to indicate which sector of the first block 102 includes the most up to date data associated with a particular memory address.

In addition, the detection module 408 detects when the first block 102 of the non-volatile memory 100 is full. Upon detecting a full condition, the detection module 408 notifies the control module 404. The control module 404 instructs the write module 406 via the interface 410 to copy valid data associated with the first block 102 to the second block 104. The control module 404 accesses the sector map 416 to determine which data sectors of the first block 102 include the most up to date (i.e the valid) data. This valid data is copied to the second block 104. In a particular embodiment, the valid data is copied to the second block 104 without finding a free block in the non-volatile memory 100. This reduces the amount of overhead for the control module 404 and allows for a faster response to write requests for the non-volatile memory 100.

The control module 404 may also update the block map 414 and the sector map 416 to record the location of the copied data. For example, the block map 414 may be updated to indicate which block includes the most up to date data associated with a particular memory address. Similarly, the sector map 416 is updated to indicate which sector of a particular block includes the most up to date data associated with a particular memory address.

After the valid data has been copied to the second block 104, and upon receiving additional data via the input 402, the control module 404 may instruct the write module 406 to continue to stream data to the second block 104, beginning at a memory location of the second block that does not include the copied valid data.

As additional data is received, the control module 404 may continue to stream data to the blocks of the non-volatile memory 100 and may copy valid data to a contiguous following block when a particular block is full. The control module 404 may copy the valid data without first locating a free block, in order to reduce the time required to copy the valid data.

The control module 404 may perform additional operations. For example, after the valid data associated with a particular block of the non-volatile memory has been copied to a subsequent block, the control module 404 may mark the particular block for erasure. The control module 404 may also determine when blocks marked for erasure should be erased, and may instruct the write module 406 to perform an erase operation. The control module 404 may also reorganize the data stored in the non-volatile memory 100, perform error detection and correction operations on the data, and perform other functions.

Figure 5:
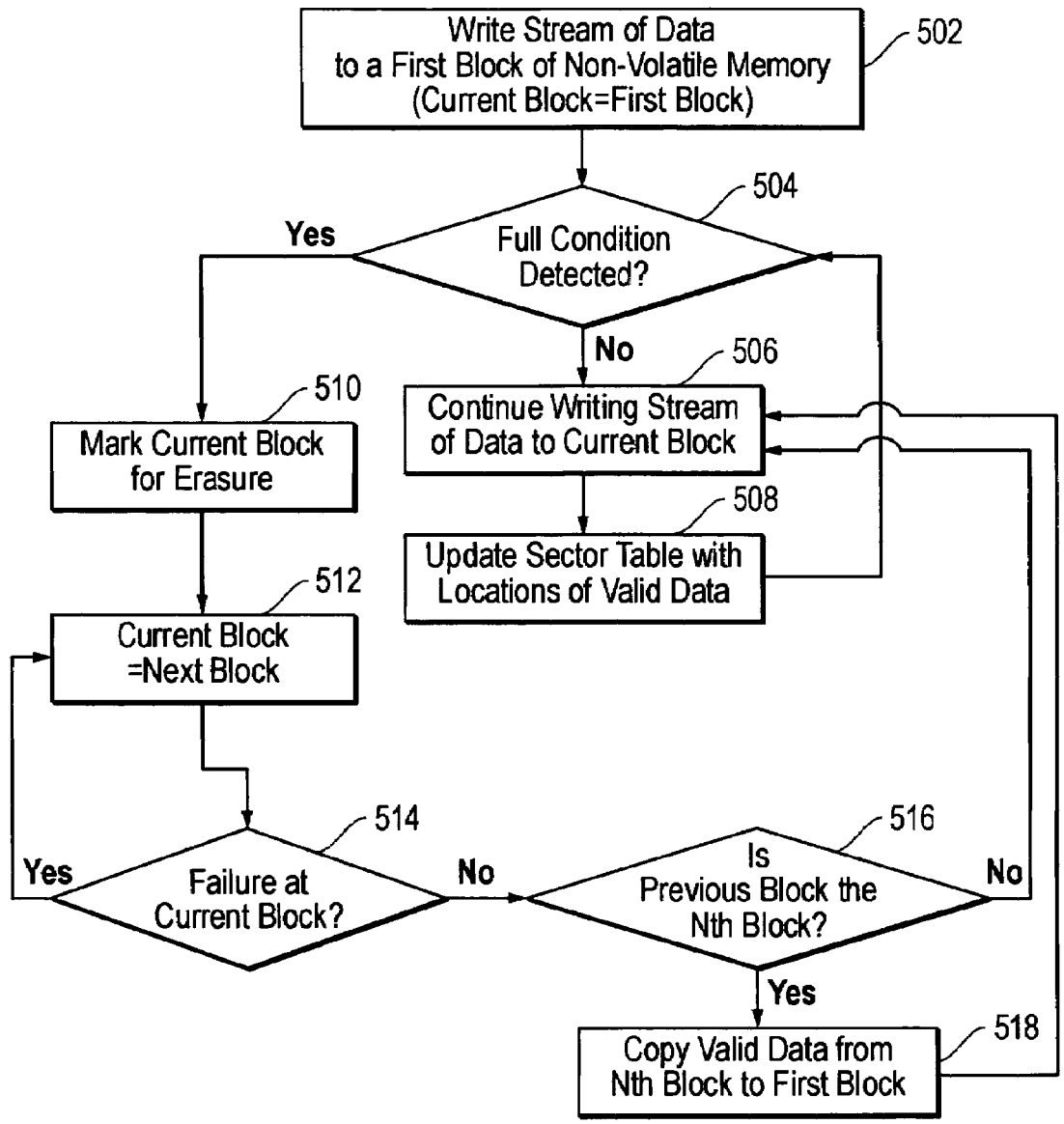
FIG. 5 is a method of writing data to a non-volatile memory.

Referring to FIG. 5, a method of writing data to a non-volatile memory is illustrated. At step 502, a stream of data is written to a first block of non-volatile memory, such as the non-volatile memory 100. The data may be written as a stream by writing the data to sequential sectors of the first block, as illustrated in FIG. 2.

Proceeding to step 504, it is determined whether a full condition of the first block of non-volatile memory is detected. The full condition may be detected in a variety of ways. A memory controller, such as the memory controller 400, may determine that the last sector of the first block has been filled. Alternatively, the memory controller may keep track of the number of write operations performed on the first block, and determine that the block is full when the number of write operations exceeds a threshold. Other ways of detecting a full condition are possible. If a full condition is not detected, the method proceeds to step 506 and the stream of data continues to be written to the current block.

Moving to step 508, a sector table is updated with the locations of the valid data associated with the current block. As illustrated in FIG. 2, each sector of the first block may be associated with a memory address. The sector map may be used to keep track of which sectors of the current block include the most up to date data associated with a particular memory address. The method then returns to step 504.

If at step 504, a full condition of the current block is detected, the method moves to step 510. At step 510, the current block is marked for erasure. The current block may not be erased immediately. Instead, the memory controller 400 or other device may schedule the block for erasure when system resources allow for efficient erasure of one or more blocks of the non-volatile memory 400.

Proceeding to step 512, the current block is set to the next block. This can be done by updating the block table 414 to indicate that subsequently received data should be written to the block set as the current block.

Proceeding to step 514, it is determined whether there is an error or failure condition at the current block. This failure may be detected by the control module 404. The control module 404 may attempt to perform error or failure correction operations, or may schedule such operations for a future time. If a failure condition is detected at the current block the method returns to step 512.

If no failure condition is detected at the current block, the memory controller 400 determines whether the previous block is the Nth block, at step 516. If the previous block is not the Nth block the method returns to step 506. If the previous block is determined to be the Nth block, the method moves to step 518 and valid data is copied from the Nth block to the first block. In this way, data can continue to be streamed to the non-volatile memory 100 even after the last block of the memory has been reached. The method then returns to step 506.

Figure 6:
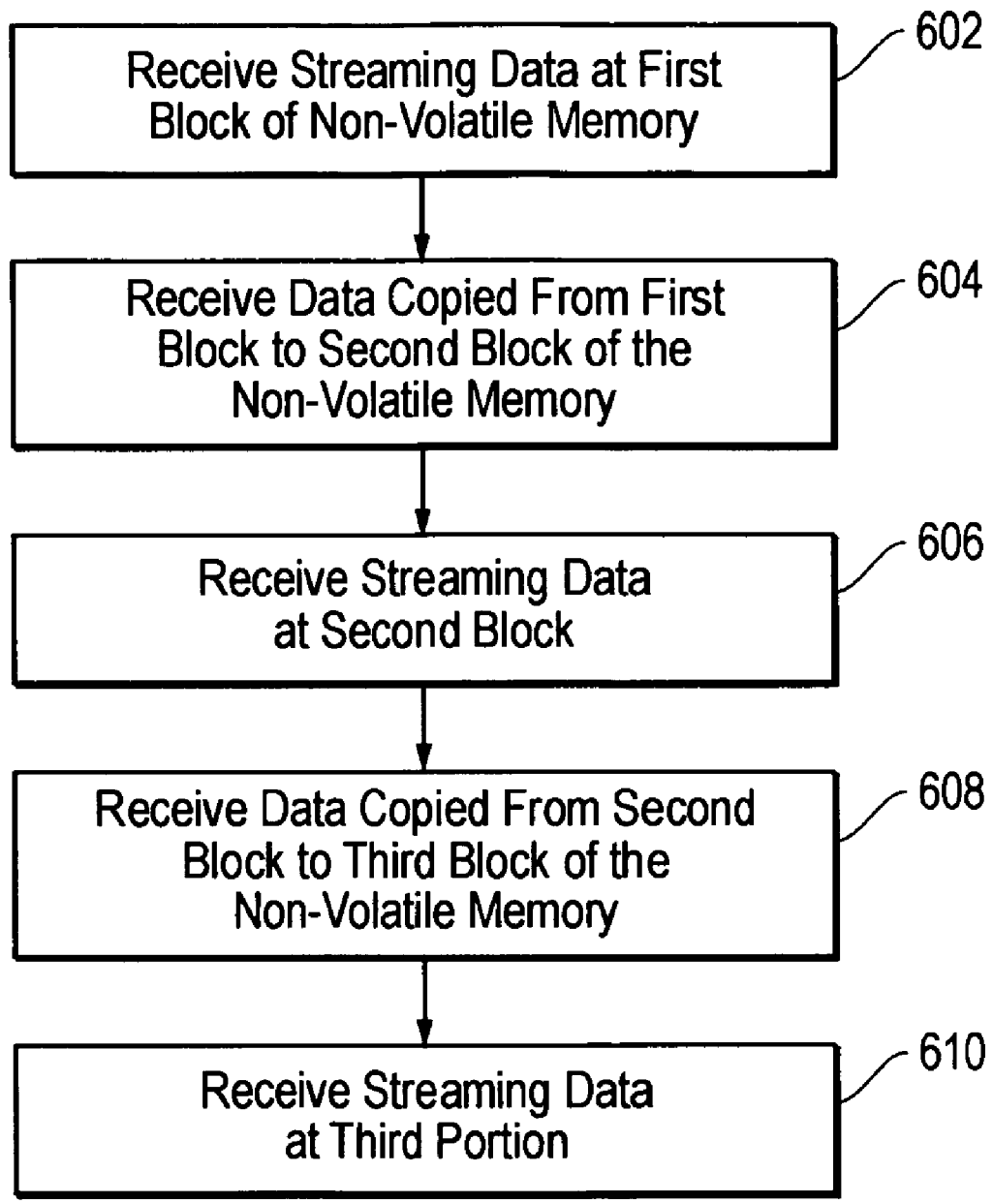
FIG. 6 is a method of receiving data at a non-volatile memory.

Referring to FIG. 6, a method of receiving data at a non-volatile memory is illustrated. At step 602, streaming data is received at a first block of a non-volatile memory, such as the non-volatile memory 100. The streaming data may be received from the memory controller 400 and may comprise a series of data items to be written to sequential sectors of the non-volatile memory 100.

Moving to step 604, data copied from the first block to a second block is received at the non-volatile memory. In a particular embodiment, the data is copied by the memory controller 400 without requiring a search for a free block in the non-volatile memory. The copied data may be the "valid data" that includes the most up to date data for each memory address associated with the data streamed to the first block.

Moving to step 606, streaming data is received at the second block. This data may be written to the second block after the second block has stored the copied data. Proceeding to step 608, data copied from the second block to a third block of the non-volatile memory is received. The data may be copied after a full condition of the second block has been detected by the memory controller 400. At step 610, streaming data is received the third block of the non-volatile memory.

Figure 7:
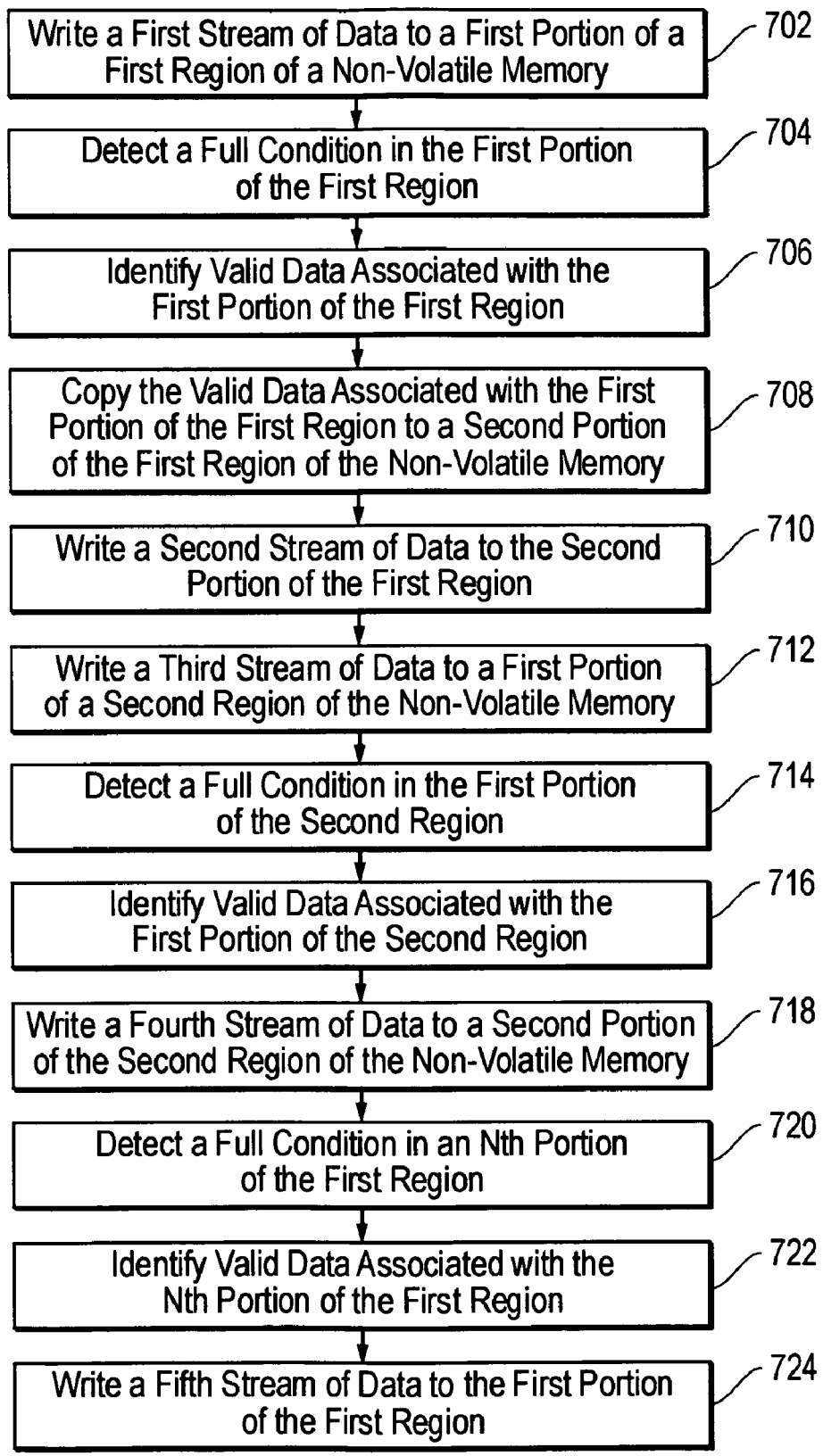
FIG. 7 is a method of writing data to a non-volatile memory including 2 or more data regions.

Referring to FIG. 7, a method of writing data to various regions of a non-volatile memory is illustrated. At step 702, a first stream of data is written to a first block of a first region of a non-volatile memory. The first region of the non-volatile memory may be a region that includes multiple blocks of memory, such as the first region 302 of FIG. 3. The stream of data may be written by writing data received at the memory controller 400 sequentially to available sectors of the first block. As data is streamed to the first block, a sector map may be updated to reflect which sector of the first block stores the most up to date (i.e. the most recently stored) data associated with a particular memory address.

Moving to step 704, a full condition is detected in the first block of the first region. At step 706, valid data associated with the first block of the first region is identified. The valid data may be identified by accessing the sector map.

Moving to step 708, the valid data associated with the first block of the first region is copied to a second block of the first region of the non-volatile memory. Moving to step 710, a second stream of data is written to remaining portions of the second block of the first region. The second stream of data may be written to sectors of the second block apart from the sectors that store the copied data, as illustrated in FIG. 2. After copying the valid data to the second block of the first region, the first block may be erased. This prepares the first block for future streams of data. Because the valid data has been copied to another block of the first region, the valid data is preserved from the erase operation.

At step 712, a third stream of data is written to a first block of the second region of a non-volatile memory. As with the first region, a sector map may be updated as the data is streamed to reflect which sectors of the second region include the most up to date data associated with a particular memory address. The sector map for the second region may be a different map than the sector map associated with the first region.

At step 714, a full condition is detected in the first block of the second region. Moving to step 716, valid data associated with the first block of the second region is identified. Moving to step 718, a fourth stream of data is written to a second block of the second region of the non-volatile memory.

Proceeding to step 720, a full condition in an Nth block (i.e. the last block) of the first region is detected. At step 722 valid data associated with the Nth block of the first region is identified. Moving to step 724, a fifth stream of data is written to a first block of the first region. In a particular embodiment, the Nth block of the first region is located in a middle area of the memory and is not located at the end of the non-volatile memory. Accordingly, each region of the non-volatile memory is self-contained, and data streamed to one region will not be written to the other. This can allow for more efficient operation of the non-volatile memory. As explained, the use of memory regions may be advantageous because the size of each region can be set so that the memory tables (such as the sector map and block map) associated with each region are at an efficient size.

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method, comprising:
    writing a first stream of data to a first block of a first region of a non-volatile memory;
    detecting a full condition of the first block of the first region of the non-volatile memory;
    marking the first block of the first region for erasure upon detecting the full condition of the first block of the first region;
    copying valid data from the first block of the first region of the non-volatile memory to a second block of the first region of the non-volatile memory after marking the first block of the first region for erasure;
    writing a second stream of data to the second block of the first region of the non-volatile memory;
    writing a third stream of data to a first block of a second region of the non-volatile memory;
    detecting a full condition of the first block of the second region of the non-volatile memory;

marking the first block of the second region for erasure upon detecting the full condition of the first block of the second region;

copying valid data from the first block of the second region of the non-volatile memory to a second block of the second region of the non-volatile memory after marking the first block of the second region for erasure;

writing a fourth stream of data to the second block of the second region of the non-volatile memory;

detecting a full condition of a last block of the first region of the non-volatile memory;

marking the last block of the first region for erasure upon detecting the full condition of the last block of the first region;

copying valid data from the last block to the first block of the first region, wherein the copying valid data from the last block occurs after the marking of the last block of the first region for erasure; and writing a fifth stream of data to the first block of the first region.

2. The method of claim 1, wherein the first region of the non-volatile memory and the second region of the non-volatile memory are different sizes.

3. The method of claim 1, wherein the first region of the non-volatile memory is at a first size during a first time period and at a second size during a second time period.

4. The method of claim 1, further comprising:
detecting a full condition of a last block of the second region;
marking the last block of the second region for erasure upon detecting the full condition of the last block of the second region;
copying valid data from the last block of the second region to the first block of the second region of the non-volatile memory after marking the last block of the second region for erasure; and
writing a sixth stream of data to the first block of the second region of the non-volatile memory.

5. The method of claim 1, wherein the last block of the first region is not located at an end of the non-volatile memory.

6. The method of claim 1, wherein the data is copied without seeking a free block.

7. A method, comprising:
writing a first stream of data to a first block of a non-volatile memory;
detecting a full condition of the first block of the non-volatile memory;
marking the first block for erasure in response to detecting the full condition of the first block;
identifying valid data associated with the first block of the non-volatile memory;
copying the valid data associated with the first block to a second block of the non-volatile memory without first seeking a free block, wherein the second block is contiguous to the first block of the non-volatile memory, wherein the copying of the valid data associated with the first block occurs after the marking of the first block for erasure;
writing a second stream of data to the second block of the non-volatile memory;
detecting a full condition of an Nth block of the non-volatile memory, where N is an integer greater than or equal to two;
marking the Nth block for erasure upon detecting the full condition of the Nth block;
copying valid data associated with the Nth block to the first block of the non-volatile memory, wherein the copying of the valid data associated with the Nth block occurs after the marking of the Nth block for erasure; and
writing an N+1st stream of data to the first block.

8. The method of claim 6, further comprising:
receiving a memory reorganization request and erasing the first block.

9. The method of claim 7, further comprising:
detecting a full condition of the second block;
marking the second block for erasure upon detecting the full condition of the second block;
copying valid data associated with the second block of the non-volatile memory to a third block of the non-volatile memory, wherein the third block of the non-volatile memory is contiguous to the second block of the non-volatile memory, and wherein the copying of the valid data associated with the second block occurs after the marking of the second block for erasure; and
writing a third stream of data to at least a portion of the third block of the non-volatile memory.

10. The method of claim 7, wherein the second block is sequential in memory to the first block.

11. The method of claim 7, wherein the first block includes a plurality of sectors and wherein the first stream of data is written sequentially to each of the plurality of sectors.

12. The method of claim 7, wherein writing the first stream of data includes writing first data associated with a memory address to a first sector of the first block of the non-volatile memory, writing second data associated with the memory address to a second sector of the first block and updating a sector address associated with the memory address in a sector mapping table.

13. The method of claim 12, wherein identifying valid data includes accessing the sector mapping table.

14. The method of claim 7, further comprising:
updating a block table associated with the first block after copying the valid data associated with the first block to the second block.

15. The method of claim 7, further comprising:
detecting a full condition of the second block of the non-volatile memory;
detecting a failure condition in a third block that sequentially follows the second block of the non-volatile memory;
copying a portion of data associated with the second block to a fourth block of the non-volatile memory without first finding a free block; and
writing a third stream of data to at least a portion of the fourth block of the non-volatile memory.

16. The method of claim 15, wherein the fourth block is contiguous to the third block.

17. A non-volatile memory comprising
a first region, the first region including:
a first block to store a first stream of data until a first block full condition associated with the first block is met, wherein, in response to the first block full condition, the first block is marked for erasure before coding valid data from the first block to a second block;
a second block to store valid data copied from the first block and to store a second stream of data after the first block full condition is met, wherein, in response to a second block full condition, the second block is marked for erasure before copying valid data from the second block to a next block of the first region;
a second region, the second region including:
a third block to store a third stream of data until a third block full condition is met, wherein, in response to the third block full condition, the third block is marked for erasure before copying valid data from the third block to a fourth block; and a fourth block to store valid data copied from the third block and to store a fourth stream of data after the third block full condition is met, wherein, in response to a fourth block full condition, the fourth block is marked for erasure before copying valid data from the fourth block to a next block of the second region;

wherein the first region includes a last block to store a stream of data until a last block full condition is met, wherein the last block is marked for erasure upon detecting a last block full condition, and wherein the first block of the first region stores valid data copied from the last block after the marking of the last block for erasure.

18. The non-volatile memory of claim 17, wherein the second region includes a last block to store a stream of data until a last block full condition is met, and wherein the first block of the second region stores valid data copied from a last block of the second region after the last block full condition is met.

19. The non-volatile memory of claim 17, wherein the first region and the second region include a different number of memory blocks.

20. The non-volatile memory of claim 17, wherein the first region includes a first number of memory blocks at a first time and a second number of memory blocks at a second time.

21. The non-volatile memory of claim 17, wherein the first region and the second region are distinct regions.

22. The non-volatile memory of claim 17, wherein a first block of the second region is adjacent to the last block of the first region.

23. A non-volatile memory, comprising:
a first block to store a first stream of data until a full condition associated with the first block of the non-volatile memory is detected, wherein the first block is marked for erasure when a full condition is met, before copying valid data from the first block to a second block;

a second block to store the valid data copied from the first block of the non-volatile memory and to store a second stream of data after the full condition is detected and wherein the data is to be copied without first identifying a free block of the non-volatile memory, wherein the second block is marked for erasure when a full condition is met, before copying the valid data from the second block to a next block; and a last block, wherein the last block is marked for erasure after a full condition associated with the last block is detected, and wherein the first block stores the valid data copied from the last block and stores a fourth stream of data, wherein the copying of the valid data occurs after the marking of the last block for erasure.

24. The non-volatile memory of claim 23, further comprising:
a third block of the non-volatile memory to store data copied from the second block of the non-volatile memory and to store a third stream of data after a full condition associated with the second block is detected.

25. A memory controller comprising:
an interface to communicate with a non-volatile memory;
a write module to write a first stream of data to a first block of the non-volatile memory and an Nth stream of data to a last block of the non-volatile memory, where N is an integer greater than one;
a detection module to detect a full condition of the first block of the non-volatile memory and a full condition of the last block of the non-volatile memory, wherein the first block is marked for erasure before copying valid data from the first block to a second block of the non-volatile memory;
a control module to copy the valid data from the first block of the non-volatile memory to the second block of the non-volatile memory without first finding a free block of the non-volatile memory and copy valid data from the last block of the non-volatile memory to the first block of the non-volatile memory without first finding a free block of the non-volatile memory, wherein the control module marks the last block of the non-volatile memory for erasure upon the detection of the full condition of the last block of the non-volatile memory, and wherein the valid data is copied to the first block of the non-volatile memory after the marking of the last block of the non-volatile memory for erasure; and
wherein the write module writes a second stream of data to the second block of the non-volatile memory after the detection module has detected the full condition of the first block and writes an N+1st stream of data to the first block of the non-volatile memory after the detection module has detected the full condition of the Nth block.

26. The memory controller of claim 25, wherein the control module erases the first block of the non-volatile memory after the valid data has been copied to the second block.

27. The memory controller of claim 25, further comprising:
a sector map to store addresses associated with the valid data.

28. The memory controller of claim 27, wherein the control module accesses the sector map to identify the valid data.

29. The memory controller of claim 27, wherein the write module updates the sector map based on contents of the first stream of data.

* * * * *